R. L. EDMONDS.
ADJUSTABLE HEADLIGHT.
APPLICATION FILED MAR. 26, 1915.

1,169,940.

Patented Feb. 1, 1916.
2 SHEETS—SHEET 1.

WITNESSES:
R. E. Hamilton
L. J. Fischer

INVENTOR:
Ralph L. Edmonds,
BY F. G. Fischer
ATTORNEY.

R. L. EDMONDS.
ADJUSTABLE HEADLIGHT.
APPLICATION FILED MAR. 26, 1915.
1,169,940.
Patented Feb. 1, 1916.
2 SHEETS—SHEET 2.
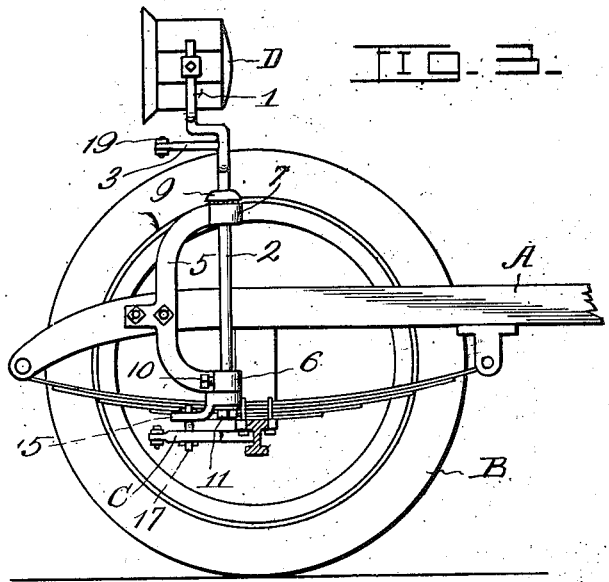
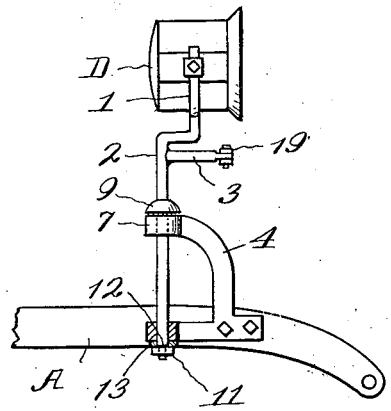
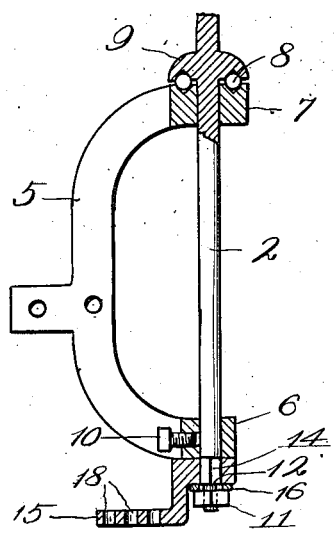
WITNESSES:
R. Hamilton
L. J. Fischer
INVENTOR:
Ralph L. Edmonds,
BY
F. G. Fischer,
ATTORNEY.

UNITED STATES PATENT OFFICE.

RALPH L. EDMONDS, OF KANSAS CITY, MISSOURI, ASSIGNOR OF ONE-FOURTH TO F. C. McINTEER, OF RAYTOWN, MISSOURI.

ADJUSTABLE HEADLIGHT.

1,169,940.   Specification of Letters Patent.   Patented Feb. 1, 1916.

Application filed March 26, 1915. Serial No. 17,149.

*To all whom it may concern:*

Be it known that I, RALPH L. EDMONDS, a citizen of the United States, residing at Kansas City, in the county of Jackson and State of Missouri, have invented certain new and useful Improvements in Adjustable Headlights, of which the following is a specification.

My invention relates to improvements in adjustable headlights for motor cars, and one object is to provide simple and efficient means for retaining said headlights in parallel position, or substantially so, with the front wheels of the car, so that when the latter rounds a curve in a road the headlights will turn laterally with said front wheels and project rays of light around said curve in advance of the car. Thus the driver can readily follow all curves in a road on the darkest night, which is not the case with fixed headlights, as the latter cast their beams at a tangent to the curves and thus leave the same in darkness.

A further object is to provide means whereby one of the headlights may be held in fixed position while its companion turns laterally with the front wheels, as above-mentioned.

Figure 1:
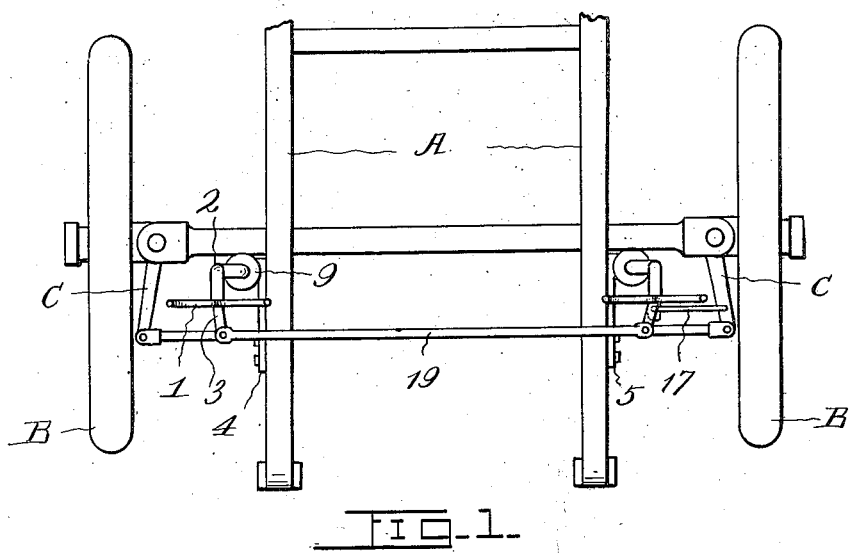
Figure 2:
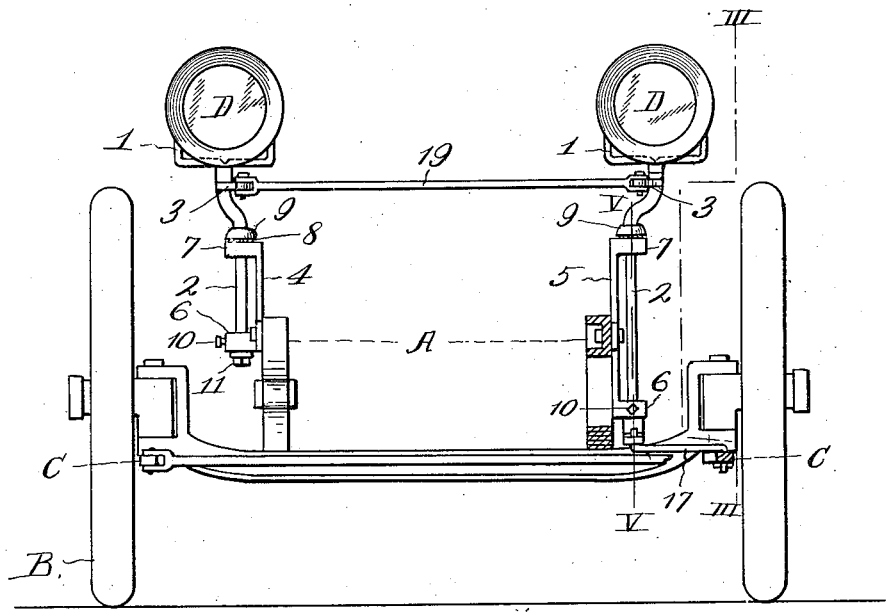

Other objects of the invention will hereinafter appear, and in order that said invention may be fully understood, reference will now be made to the accompanying drawings, in which:

Figure 1 is a broken plan view of the front portion of an automobile provided with my invention. Fig. 2 is an elevation partly in section of the parts disclosed by Fig. 1, with the addition of the headlights. Fig. 3 is an irregular section on line III—III of Fig. 2. Fig. 4 is a detail side elevation. Fig. 5 is a section, enlarged, on line V—V of Fig. 2.

A designates the front port of the chassis, B the front wheels, C the steering-arms, and D the headlights of an automobile, all of the foregoing parts being of any ordinary or preferred construction.

In carrying out the invention, I mount each headlight D upon a fork 1 on the upper end of a shaft 2, provided with a crank-arm 3. The shafts 2 are of different lengths, the shorter one being mounted in a bracket 4, while the longer one is mounted in a bracket 5, both of which are securely bolted or otherwise secured to the adjacent sides of the chassis A. Brackets 4 and 5 have lower bearings 6 and upper bearings 7, in which the respective shafts 2 are journaled. The upper bearings 7 are provided with balls 8, which operate in ball-races in said bearings 7 and in peripheral shoulders 9 on the shafts 2. The lower bearings 6 are provided with suitable means for securing the shafts 2 in fixed position when desired, so that they cannot turn laterally with the front wheels B. Any suitable means, such as set-screws 10, may be provided for securing the shafts 2 in such fixed position.

The shafts 2 are prevented from moving upward off the balls 8 by nuts 11, threaded upon the lower ends of said shafts 2, which latter have shoulders 12 to prevent the nuts from being screwed up far enough to draw the shoulders 9 down too tightly upon the balls 8. A washer 13 is interposed between one of the nuts 11 and the underside of the adjacent bearing 6, to turn with said nut and prevent it from becoming accidentally unscrewed from its shaft 2. The other shaft 2 has a rectangular portion 14 just below the adjacent bearing 6, to receive a crank-arm 15, which has an opening snugly fitting said rectangular portion 14, to prevent independent rotation of said shaft 2, and its crank-arm 15. A washer 16 is interposed between the lower end of the rectangular portion 14 and the adjacent nut 11, to prevent accidental unscrewing of said nut.

17 designates a link for connecting the crank-arm 15 to the adjacent steering-arm C, so that the latter can actuate the former. In order to vary the throw of the crank-arm 15 and consequent rotation of the headlights D, I provide said crank-arm with a series of holes 18, any one of which is adapted to receive the upturned end of the link 17.

19 designates a connecting-rod pivotally-secured at its ends to the crank-arms 3 to cause simultaneous rotation of the shafts 2.

From the foregoing description, it is obvious that when the front wheels B are turned laterally to go around a corner, the lamps D are turned therewith through the intermediacy of the intermediate mechanism, and since said mechanism is connected to but one steering-arm C, there is no danger of any of the parts binding or buckling in operation. This arrangement of connecting my mechanism with but one steering-arm C also permits one headlight to turn laterally with the front wheels, while the other headlight is held stationary through the intermediacy of its respective set-screw 10 when the link 17 is removed, or if desired both headlights D may be held stationary by their respective set-screws 10, when the link 17 is disconnected from the crank-arm 15.

Having thus described my invention, what I claim and desire to secure by Letters Patent, is:

In combination with the wheeled chassis and steering mechanism of an automobile, a pair of lamp brackets secured to opposite sides of the chassis adjacent the forward portion thereof, said brackets adapted to support said lamps above the upper plane of the wheels, each of said brackets having right angled ends forming spaced bearings, one of the brackets being relatively long, and having one of its bearings in a plane with the axis of the front wheels of the automobile, lamp supporting shafts mounted in the bearings of the brackets, the shaft supported by the long bracket, having one of its ends extending below the lower bearing thereof, said shaft having a right angled end portion, extending in the same plane with the steering arm, and a horizontal link extending at right angles to the right angled end of the shaft of the long bracket and the steering arm, for connecting the steering arm and shaft of the long bracket, and means for connecting the lamp supporting shafts.

In testimony whereof I affix my signature, in the presence of two witnesses.

RALPH L. EDMONDS.

Witnesses:
F. G. FISCHER,
L. J. FISCHER.